(12) United States Patent
Mimberg

(10) Patent No.: US 7,421,604 B1
(45) Date of Patent: Sep. 2, 2008

(54) ADVANCED VOLTAGE REGULATION USING FEED-FORWARD LOAD INFORMATION

(75) Inventor: Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 457 days.

(21) Appl. No.: 11/189,223

(22) Filed: Jul. 25, 2005

(51) Int. Cl.
*G06F 1/26* (2006.01)
(52) U.S. Cl. .......................... 713/340; 713/300; 713/310
(58) Field of Classification Search ......... 713/300–320, 713/323, 340
See application file for complete search history.

(56) References Cited

U.S. PATENT DOCUMENTS

| | | | | |
|---|---|---|---|---|
| 6,978,388 B1* | 12/2005 | Cornelius | ................... | 713/320 |
| 2002/0144163 A1* | 10/2002 | Goodfellow et al. | ........ | 713/300 |
| 2003/0051124 A1* | 3/2003 | Dowling | ..................... | 712/244 |
| 2004/0221182 A1* | 11/2004 | He et al. | ..................... | 713/300 |
| 2004/0257048 A1* | 12/2004 | Chagny | ....................... | 320/141 |

* cited by examiner

*Primary Examiner*—Dennis M Butler
(74) *Attorney, Agent, or Firm*—Patterson & Sheridan, LLP

(57) ABSTRACT

Methods and apparatus for controlling a voltage supplied to a device based on an anticipated change in load current demanded by the device are provided. In response to detecting the anticipated change in load current, a load control signal may be generated that causes the voltage regulator to adjust the output voltage supplied to the device.

10 Claims, 5 Drawing Sheets

ADVANCED VOLTAGE REGULATION USING FEED-FORWARD LOAD INFORMATION

CROSS-REFERENCE TO RELATED APPLICATIONS

This application is related to co-pending U.S. patent application entitled, "VOLTAGE REGULATOR WITH INTERNAL CONTROLS FOR ADJUSTING OUTPUT BASED ON FEED-FORWARD LOAD INFORMATION" Ser. No. 11/189,203, filed herewith.

BACKGROUND OF THE INVENTION

1. Field of the Invention

This invention relates generally to computer systems and more specifically to an apparatus and method for adjusting operation of a voltage regulator in anticipation of a change in load.

2. Description of the Related Art

In a typical computer system, one or more voltage regulators provide supply voltages to various system components. For example, a first voltage regulator on a motherboard may provide a supply voltage to a central processing unit (CPU) while a second voltage regulator on a graphics card may provide a supply voltage to a graphics processing unit (GPU). Unfortunately, as operating frequencies increase, voltage regulators may struggle to supply enough current when such processing devices rapidly demand additional current.

This may be illustrated by considering the exemplary graphics processing subsystem shown in FIG. 1, in which a voltage regulator 100 provides a supply voltage ($V_{OUT}$) to a GPU 110. The GPU 110 may utilize a number of high speed processing pipelines operating in parallel to produce high end (realistic) graphical output. When these pipelines are not being heavily used, the current demand of a GPU may be relatively stable. However, when several of these pipelines are loaded up for processing, the resultant switching (of potentially several hundred million transistors) may cause a current demand several times greater than what is demanded when the pipelines are not as heavily loaded.

As illustrated in FIG. 2, a sudden increase in current when the GPU pipelines are heavily loaded (at time T0) may result in a transient drop (spike) in supply voltage, as the current supplied by an output capacitor (or set of capacitors) $C_O$ is depleted. As illustrated in FIG. 1, voltage regulators may utilize some type of feedback mechanism, such as a feedback circuit 120 that samples the output voltage and provides a voltage or current feedback signal to the regulator 100. By monitoring this feedback signal and detecting the voltage drop, the regulator can compensate for the drop in voltage by increasing its output, for example, by generating an error signal and using it to increase the duty cycle of a pulse-width-modulated PWM signal used to drive a switching transistor. As a result, after a recovery time (labeled TR0) which may be several milliseconds, the output voltage may recover to at least approach the previous level.

Similarly, when the pipelines are unloaded (at time T1), a sudden decrease in current load may result in a upward transient spike. For some cases, the peak-to-peak magnitude of the transient may be even greater upon release of the load than when the load is increased. In any case, the feedback mechanism may ensure that after a recovery time (labeled TR1) the output voltage may recover to at least approach the previous level.

If these transient voltage spikes cause the supply voltage level to fall below a minimum threshold or exceed a maximum threshold, the GPU may fail, regardless of how quickly the previous voltage level is restored. Unfortunately, by the time the regulator 100 is able to detect the transient voltage changes based on the feedback signal, the output voltage may have changed too much to allow the regulator 100 to adequately compensate. In some cases, the peak-to-peak magnitude of the transient voltage spikes may be controlled with careful selection of components in the regulator circuit. For example, output capacitors $C_O$ (typically dominated by rather large "bulk" capacitors) used in the regulator circuit may be chosen with an effective series resistance (ESR) that minimizes peak-to-peak transient magnitudes, while still providing an adequate recovery time. Unfortunately, the size and/or cost penalty of such capacitors tends to be prohibitive.

Accordingly, what is needed is an improved method and apparatus for regulating voltage supplied to integrated circuit devices, such as processing devices (CPUs and GPUs) that exhibit large abrupt changes in current demand.

SUMMARY OF THE INVENTION

Embodiments of the present invention generally provide methods and apparatus for controlling a voltage supplied to a device based on an anticipated change of load current demanded by the device.

One embodiment provides a method of controlling a voltage provided to a device by a voltage controller. The method generally includes detecting an expected change in a load current required by the device and in response, generating a signal to cause the voltage controller to adjust its output in anticipation of the change in load current required by the device.

Another embodiment provides an integrated circuit device generally including a plurality of instruction pipelines and load control logic. The load control logic is generally configured to generate a load control signal in response to detecting an expected change in supply current required by the processing device based on monitored activity in the pipelines.

Another embodiment provides a computer system generally including a voltage regulator and a processor device. The system also includes a mechanism for adjusting a load control signal in response to detecting an expected change in supply current demanded from the voltage regulator to operate the processor device and a mechanism for altering the output voltage supplied by the voltage generator in response to a change in the load control signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a mechanism allowing a voltage regulator to adjust its output voltage in anticipation of a change in load. The voltage regulator provides a supply voltage to a device which, therefore, represents a load driven by the voltage regulator. The device, in turn, provides a load signal in anticipation of a change in load (e.g., caused by the utilization of a greater or lesser number of components on the device). In other words, the load signal may provide an "early warning signal" of sorts, causing the voltage regulator to adjust the supply voltage provided to the device to minimize the impact of transient voltage spikes caused by the change in load. As a result, the effective transient voltage response of the voltage regulator may improved, while the size and cost of components in the regulator circuitry (e.g., load capacitors) may be reduced.

As a specific, but not limiting example, one embodiment of the present invention provides a graphics processing unit (GPU) that adjusts a load signal in anticipation of a change in load, for example, based on an expected change in utilization of a number of parallel processing pipelines. However, those skilled in the art will recognize that the concepts described herein may be used to similar advantage in a variety of different devices, such as central processing units (CPUs) digital signal processors (DSPs), and the like, to reduce the impact of voltage transients caused by abrupt changes in load.

An Exemplary System

Figure 3:
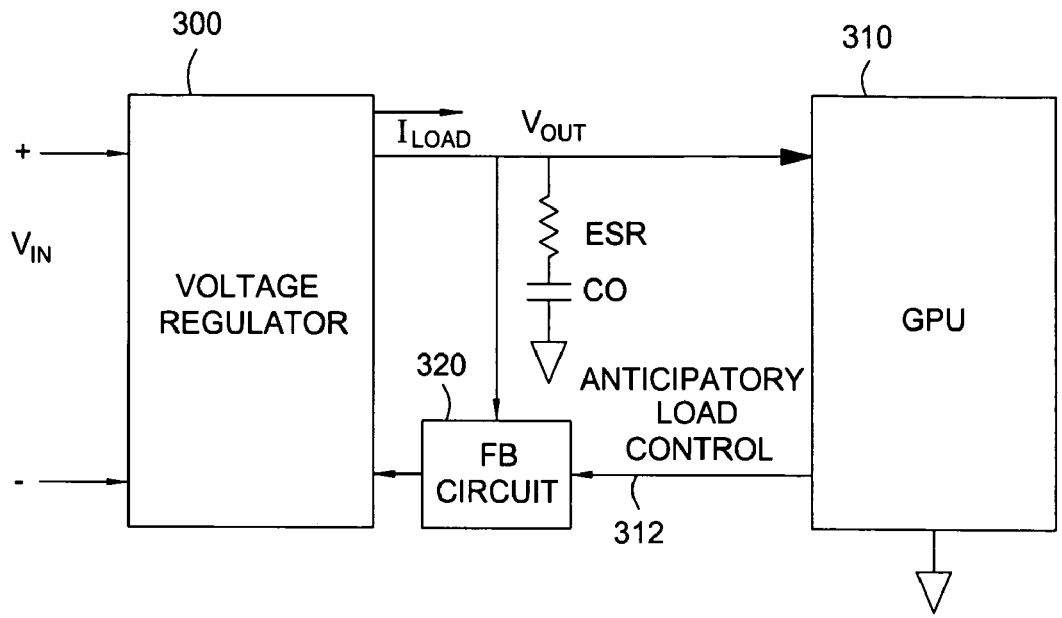
FIG. 3 illustrates an exemplary graphics subsystem with a voltage regulator providing a supply voltage to a graphics processing unit (GPU) in accordance with embodiments of the present invention.

FIG. 3 illustrates an exemplary voltage regulator 300 that provides a supply voltage ($V_{OUT}$) to a GPU 320 that generates an feed-forward load signal 312 (in anticipation of an increase in load current). As illustrated, for some embodiments, the load signal 312 may be used to control feedback circuitry 320 that generates a feedback signal monitored by the voltage regulator 300 and used to adjust the voltage regulator output power to maintain a desired output voltage $V_{OUT}$.

Figure 1:
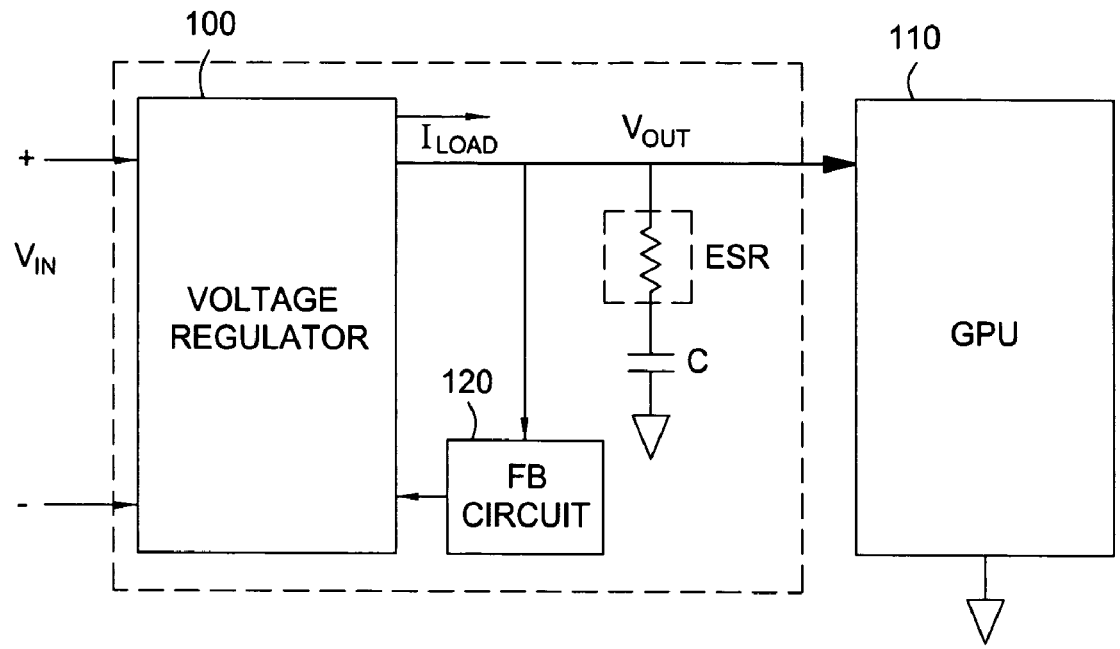
FIG. 1 illustrates an exemplary graphics subsystem with a voltage regulator providing a supply voltage to a graphics processing unit (GPU) in accordance with the prior art.
Figure 2:
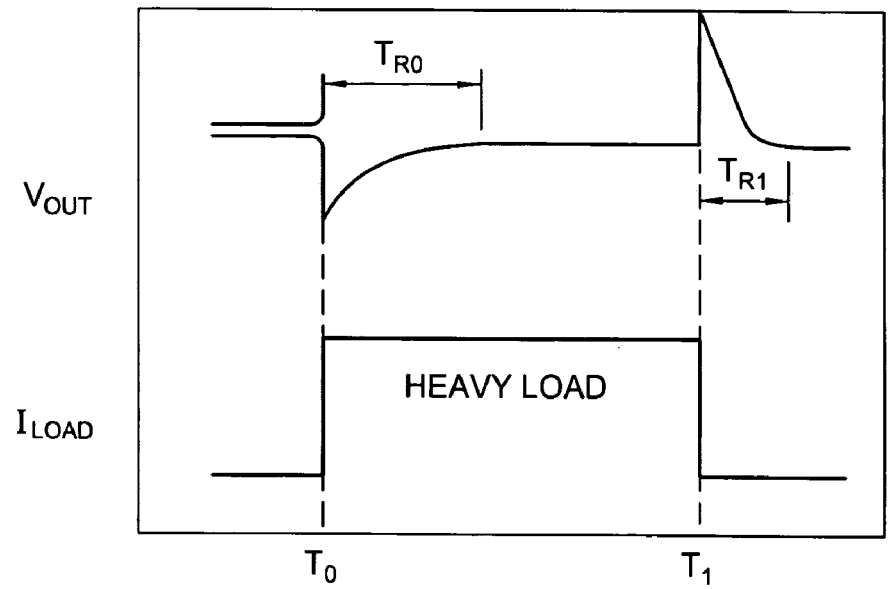
FIG. 2 illustrates an exemplary current load induced transient voltage response of the voltage regulator of FIG. 1 in accordance with the prior art.

As previously described, the GPU 310 may utilize a number of high speed processing pipelines operating in parallel. When several of these pipelines are loaded up for processing, after being idle, the resultant load increase may cause current demand several times greater than what is demanded when the pipelines are not as heavily loaded. With several hundred million transistors in the pipelines, the increase in current may be well over 100%. As previously described, with reference to FIGS. 1 and 2, in conventional systems, such an abrupt change in load may result in transient voltage spikes that might cause operational failures if the supply voltage levels fall outside operational limits. In addition, voltage overshoots caused when current demand is abruptly reduced may lead to reduced reliability.

Figure 4:
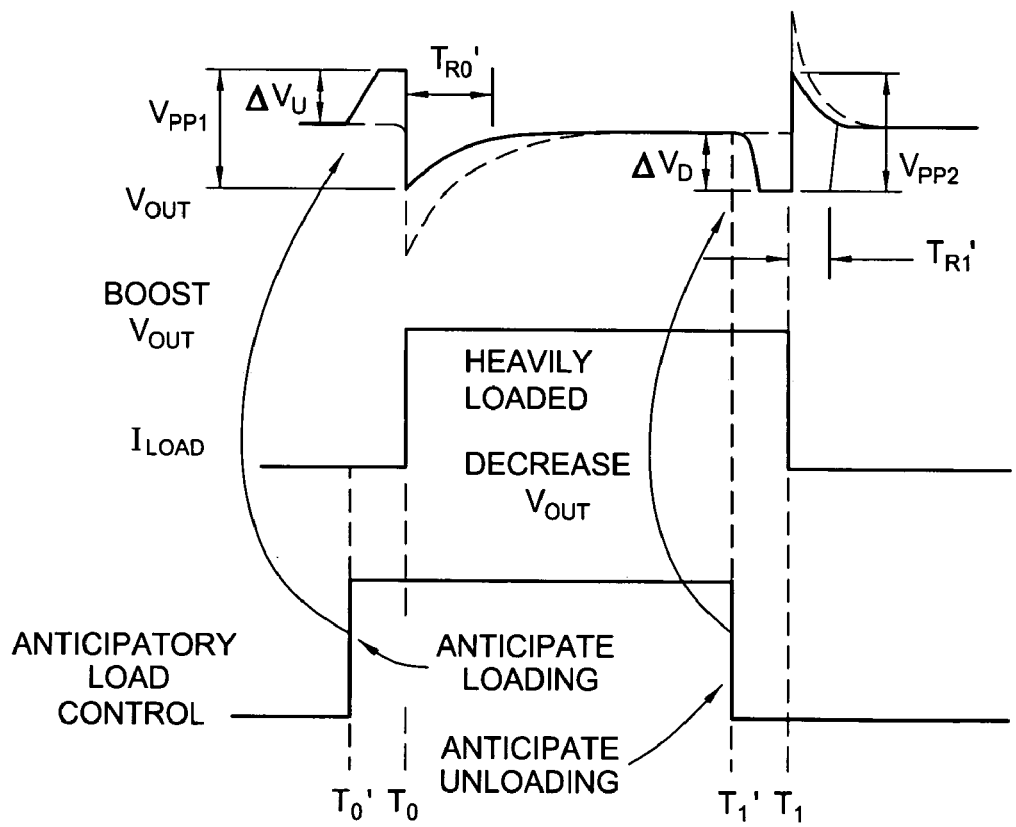
FIG. 4 illustrates an exemplary current load induced transient voltage response of the voltage regulator of FIG. 1 utilizing a load line feature of a voltage regulator in accordance with embodiments of the present invention.

As explained in greater detail herein, by generating the load signal in anticipation of such a change in load, the GPU 310 may provide an early warning signal of sorts, causing the voltage regulator 300 to adjust the supply voltage to compensate. For example, as illustrated in FIG. 4, at time T0', prior to an expected sudden increase in current when the GPU pipelines are heavily loaded (at time T0), the load signal may cause $V_{OUT}$ to be adjusted upward (by $\Delta V_U$). As a result, when the load current increases, at time T0, the transient dip in voltage does cause the voltage to drop as low as it would have without the shift up. The anticipatory increase in voltage may result in additional current being available from the output capacitor, allowing it to better handle the increase in load. Similarly, prior to unloading the pipelines, at time T1', the load signal may be changed, causing $V_{OUT}$ to be adjusted downward (by $\Delta V_D$). As a result, when the load current decreases, at time T1, the transient increase in voltage is not as great as it would have been absent the anticipatory shift down in the regulator output voltage.

For comparison, in FIG. 4 the transient swings in supply voltage signal without the anticipatory shifts before loading and unloading, are shown as dashed lines. In some cases, the peak-to-peak magnitude of the transients may be the same with and without use of the load signal. However, the absolute minimum voltage level reached is shifted up by increasing the supply voltage in anticipation of the loading, while the absolute maximum voltage level reached is shifted down by decreasing the supply voltage in anticipation of the unloading. In addition to providing a safety margin from the minimum and maximum values, by decreasing the total deviation from the nominal operating voltage, the response times required to recover from the loading and unloading (TR0' and TR1', respectively) are decreased. While this technique works with regulators that utilize load line (or droop) functionality, other regulators may utilize different circuitry responsive to a load signal. While this technique works with regulators that utilize load line (or droop) functionality, other regulators may utilize different circuitry responsive to a load signal. Further, even if the load signal is generated with little or no advanced warning relative to an increase in demand current, the load signal may result in faster regulator response time than the output voltage propagating through all the capacitors. In some cases, the load signal could even come after a load change and there may still be an advantage in quicker regulator response time.

Figure 5:
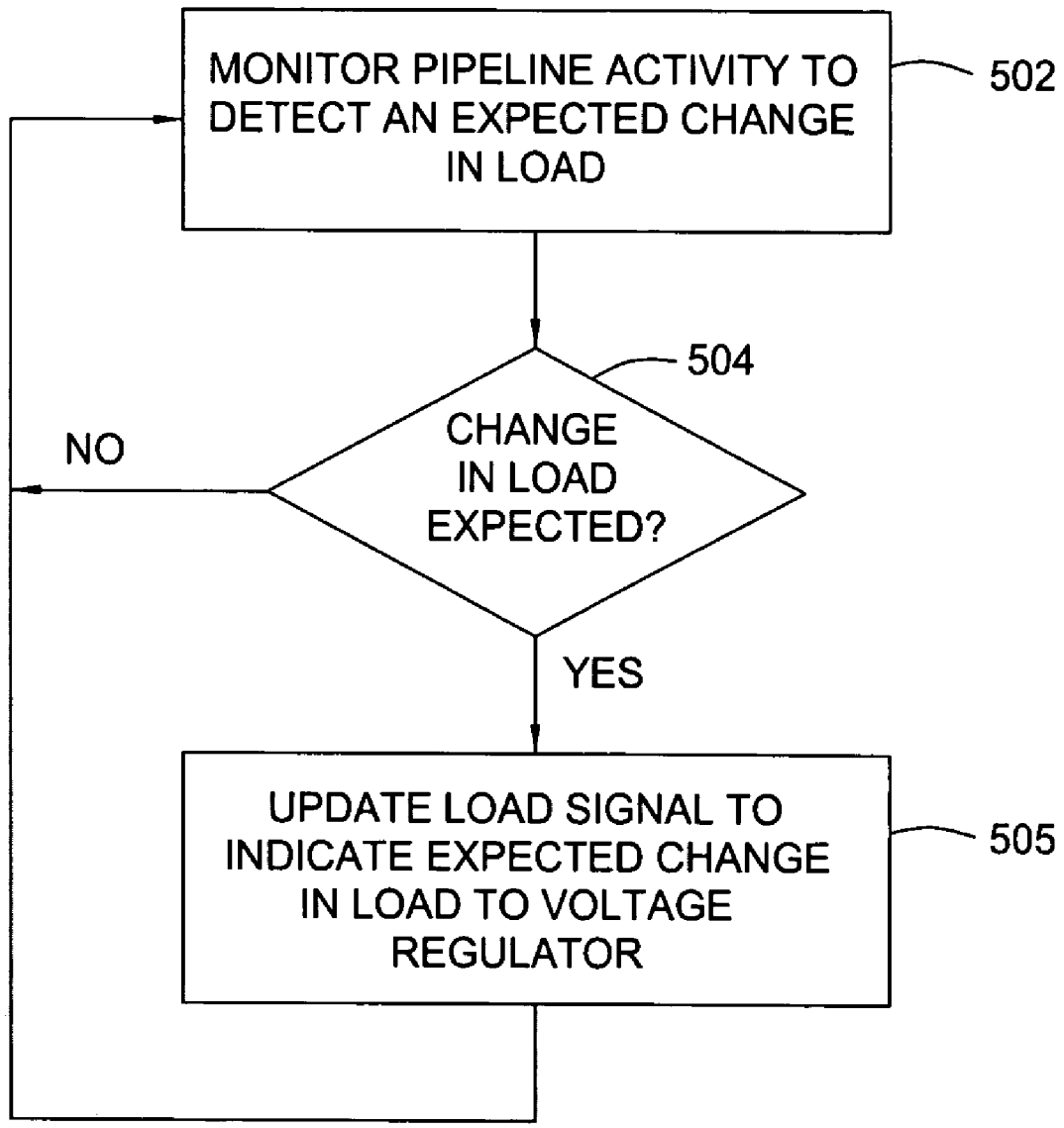
FIG. 5 is a flowchart of exemplary operations for controlling a voltage regulator in accordance with one embodiment of the present invention.

FIG. 5 is a flowchart of exemplary operations for controlling a voltage regulator in accordance with one embodiment of the present invention. For example, these operations may be performed, for example, by the GPU 310 in order to adjust the load signal 312 to provide an early warning to the voltage regulator 300 of expected changes in load current. For some embodiments, an external device, such as a CPU that sends instructions or data to a GPU via a software driver, may detect an anticipated change in load current demanded by the GPU and may generate the load control signal instead of the GPU.

The operations begin, at step 502, by detecting an expected change in load current. As an example, the GPU 310 may monitor a number of idle cycles for a sample set of pipelines as an indication that the pipelines are being loaded. As another example, a set of instructions (e.g., a shader program), executed by the GPU 310 may contain markers that provide an indication to the GPU 310 that heavy pipeline activity, or a reduction in pipeline activity, is likely.

In any case, if a change in load is not expected, as determined at step 504, the operations are repeated without adjusting the load signal. On the other hand, if a change is load is expected, the load signal is adjusted, at step 506, thereby causing the a corresponding anticipatory change in the voltage supplied by the voltage regulator. As will be described in greater detail below, the load signal may be a single bit (e.g., driven on a singly output pin) or multiple bits. A single bit output signal will allow a device to indicate more or less current is to be required. Multiple bits, on the other hand, may allow quantification of the additional current expected (e.g., 25%, 50%, etc.), allowing the anticipatory increases or decreases in voltage supplied by the regulator to be adjusted accordingly.

Exemplary Mechanisms for Adjusting Output Voltage Based on a Load Signal

For some embodiments, feedback circuitry external to the voltage regulator may be configured to allow adjustment of a feedback signal provided to the voltage regulator in response to a change in a load signal provided by a processing device. The exact circuitry may vary depending on the exact type of feedback signal utilized by the voltage regulator.

Figure 6:
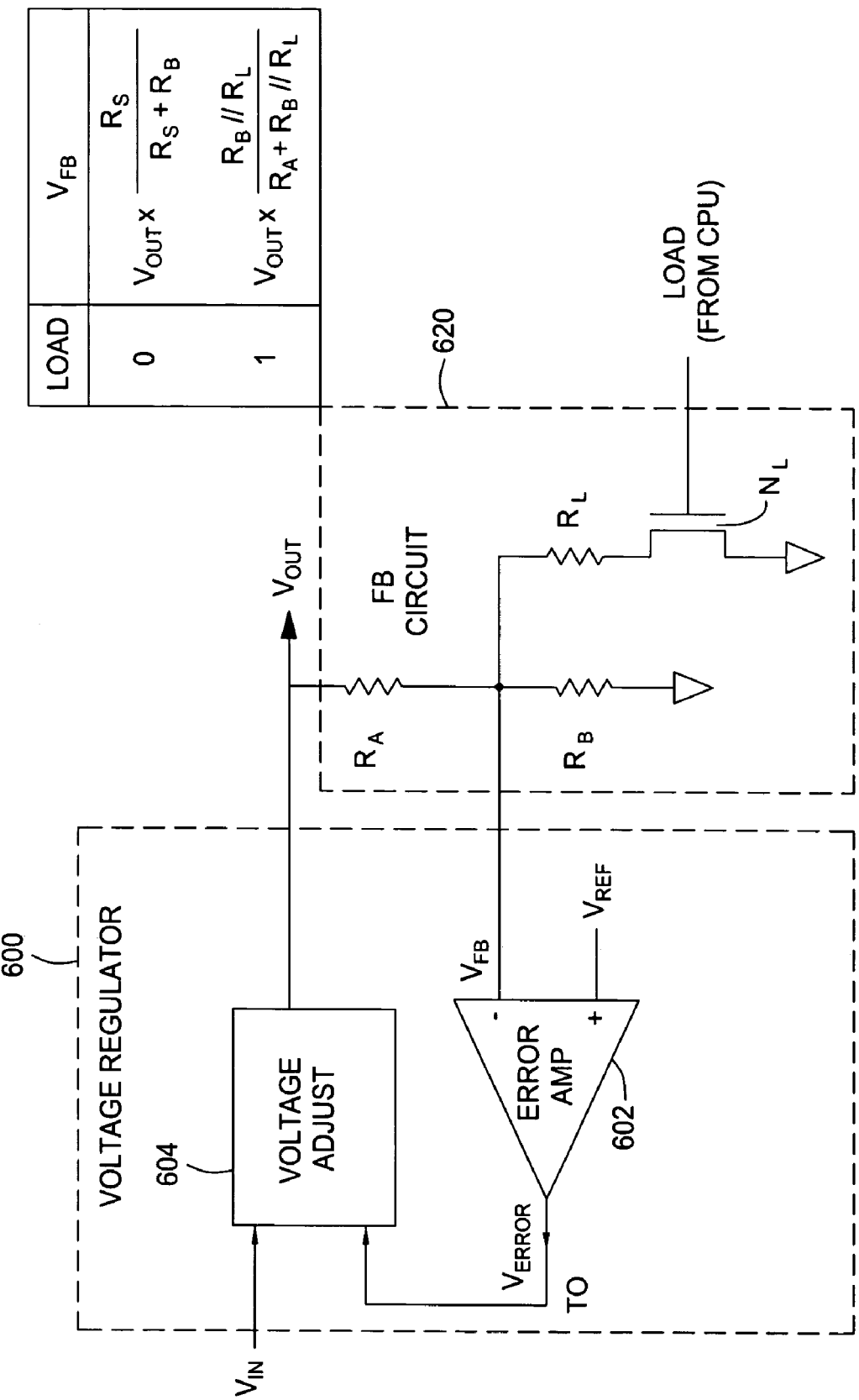
FIG. 6 illustrates an exemplary circuit arrangement for controlling a voltage regulator by artificially adjusting a feedback voltage based on a load control signal.

As an example, FIG. 6 illustrates a feedback circuit 620 configured to vary a feedback voltage ($V_{FB}$) provided to a voltage regulator 600. As illustrated, the load signal is used to switch a transistor $N_L$ in order to vary the resistance of a voltage divider circuit (formed by $R_A$, $R_B$, and $R_L$, depending on the load signal) used to generate the feedback voltage. When the load signal is not asserted (logic low or '0'), the transistor NL is switched off and the feedback voltage is defined by the following equation based on the voltage divider:

$$V_{FB}=V_{OUT}*[R_B/(R_A+R_B)]$$

Once the load signal is asserted (logic high or '1'), indicating an expected increase in current demand, the transistor $N_L$ is switched on and the bottom portion of the voltage divider network becomes $R_L$ in parallel with $R_B$ ($R_B\|R_L$). As a result, the feedback voltage is defined by the following equation based on the voltage divider:

$$V_{FB}=V_{OUT}*[R_B\|R_L/(R_A+R_B\|R_L)]$$

Because the parallel combination of RB and RL is less than RB alone, the feedback voltage is reduced which should cause the voltage regulator 600 to increase its output and raise $V_{OUT}$. As illustrated, the regulator 600 may include an error amplifier 602 that generates an offset or "error" voltage $V_{ERROR}$ indicating a difference between the feedback voltage and a reference voltage. The error voltage may be fed back to a voltage adjust circuit 604 that increases the output voltage if the feedback voltage is less than the reference or decreases the output voltage if the feedback voltage is greater than the reference voltage.

For embodiments where a multi-bit load signal is generated, multiple load resistors may be selectively placed in parallel to incrementally adjust the feedback voltage, as necessary. For some embodiments, the load signal may be used to adjust the reference voltage in a similar manner, which may have a similar effect. For example, increasing $V_{REF}$ when the load signal is asserted would also result in an increase in $V_{ERROR}$ and a corresponding increase in $V_{OUT}$.

Figure 7:
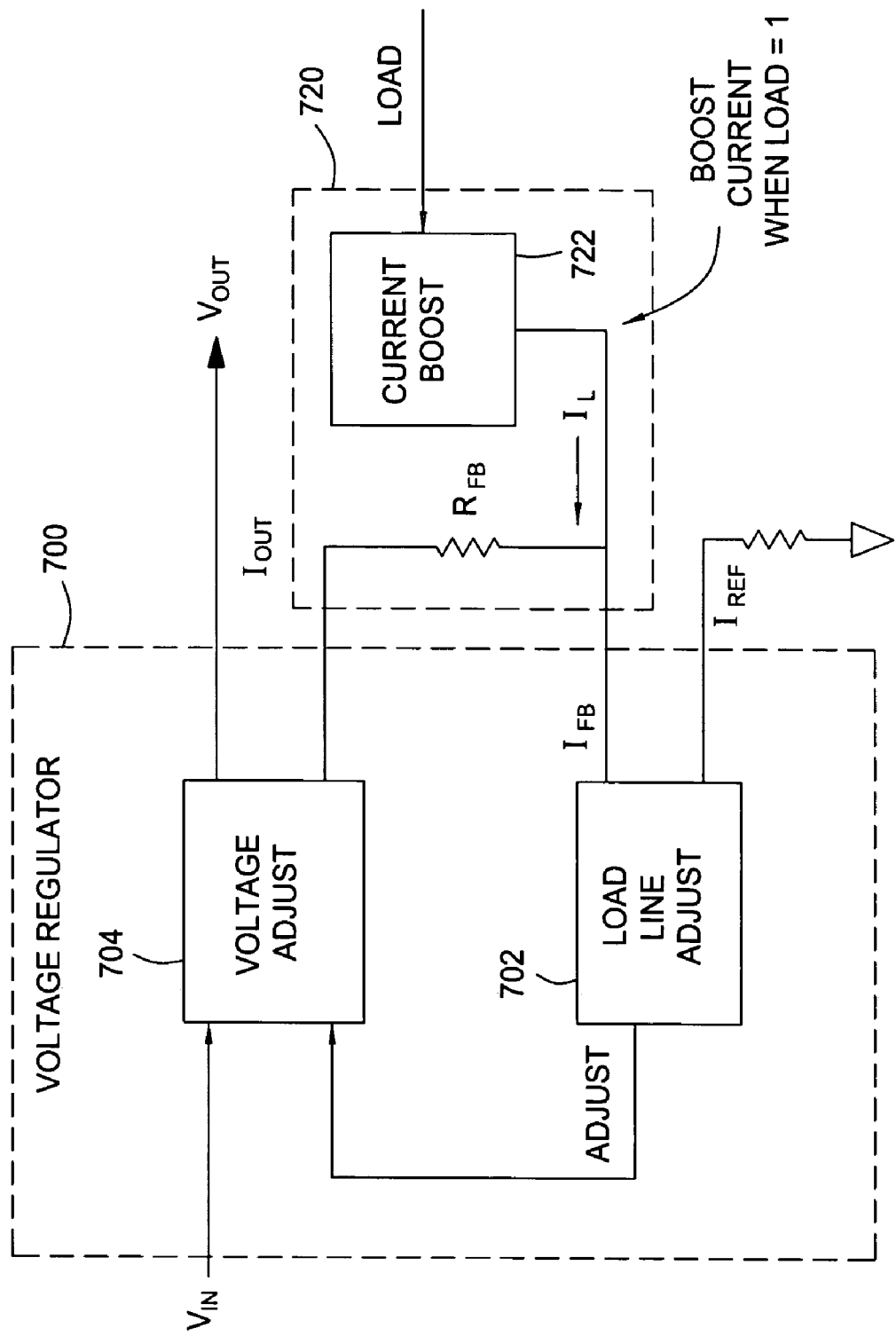
FIG. 7 illustrates an exemplary circuit arrangement for controlling a voltage regulator by artificially adjusting a feedback current based on a load control signal.

As another example of how the load signal may be used to adjust the output voltage of a regulator, FIG. 7 illustrates a feedback circuit 720 configured to vary a feedback current ($I_{FB}$) provided to a voltage regulator 700. As illustrated, the load signal may be used to control a current boost circuit 722. For example, the boost circuit 722 may be configured to generate an additional current $I_L$ that is used to increase the feedback current $I_{FB}$ when the load signal is asserted. In response, a load line adjust circuit 702 of the regulator 700 may generate a signal to a voltage adjust circuit 704 to increase the output voltage based on a comparison of the feedback current to a reference current ($I_{REF}$). When the load signal is not asserted, the additional current may be removed ($I_L$=0), causing a corresponding reduction in $V_{OUT}$.

Those skilled in the art will recognize that various other types of feedback mechanisms may also be used and such mechanisms may be configured to allow the feedback signal provided thereby to be varied in any manner appropriate based on a load signal generated by a processor device.

While the foregoing is directed to embodiments of the present invention, other and further embodiments of the invention may be devised without departing from the basic scope thereof, and the scope thereof is determined by the claims that follow.

The invention claimed is:

1. A method of controlling a voltage provided to a graphics processing device that includes multiple processing pipelines for processing data by a voltage controller, the method comprising:
   receiving at the voltage controller a feedback error signal for controlling an output of the voltage controller
   detecting an expected change in a load current required by the graphics processing device; and
   in response, generating a load control signal to modify the feedback error signal and cause the voltage controller to adjust its output in anticipation of the change in load current required by the graphics processing device.

2. The method of claim 1, wherein detecting an expected change in a load current required by the graphics processing device comprises monitoring activity in one or more processing pipelines of the graphics processing device and to determine an expected change in pipeline activity.

3. The method of claim 1, wherein:
   detecting an expected change in the load current required by the graphics processing device comprises detecting an expected increase in load current required by the graphics processing device; and
   generating the load control signal to reduce a feedback voltage signal supplied to the voltage controller to cause the voltage controller to increase a supply voltage provided to the graphics processing device in anticipation of the change in load.

4. The method of claim 1, further comprising:
   detecting an expected decrease in the load current required by the graphics processing device; and
   in response, generating a signal to increase a feedback voltage signal supplied to the voltage controller to cause the voltage controller to decrease a supply voltage provided to the graphics processing device in anticipation of the change in load.

5. The method of claim 1, wherein the generated signal comprises a plurality of bits loaded into a writable register to fix the level of the expected change in load current.

6. A computer system, comprising:
   a voltage regulator;
   an processor device incorporating multiple pipelines for processing data that is provided a supply voltage by the voltage regulator;
   a mechanism for providing a feedback error signal to the voltage regulator to control the supply voltage;
   a mechanism for adjusting a load control signal in response to detecting an anticipated change in supply current demanded from the voltage regulator to operate the multiple pipelines of the processor device, as different numbers of pipelines are expected to be utilized to process the data; and a mechanism for altering the output supply voltage supplied by the voltage regulator in response to a change in the load control signal by altering the feedback error signal in accord with the magnitude of the adjusted load control signal.

7. The system of claim 6, wherein the processor device is a graphics processing unit (GPU).

8. The system of claim 6, wherein the mechanism for adjusting the load control signal is configured to monitor expected activity in processing pipelines of the processor.

9. The system of claim 6, wherein the mechanism for adjusting the load control signal resides on the processor device.

10. The system of claim 6, wherein:

the load control signal comprises multiple bits; and the mechanism for adjusting the output voltage supplied by the voltage regulator comprises a plurality of resistors placed in parallel and selectively utilized to modify the load control signal, each of the resistors being associated with one of the bits of the load control signal, the mechanism for altering the output voltage being configured to alter the output voltage in different magnitudes based on different combinations of values of the multiple bits.

* * * * *